Sept. 14, 1965  B. BURWELL ETAL  3,206,276
PROCESS FOR RECOVERY OF PURE $V_2O_5$
FROM VANADIUM BEARING MATERIALS
Filed Sept. 28, 1961
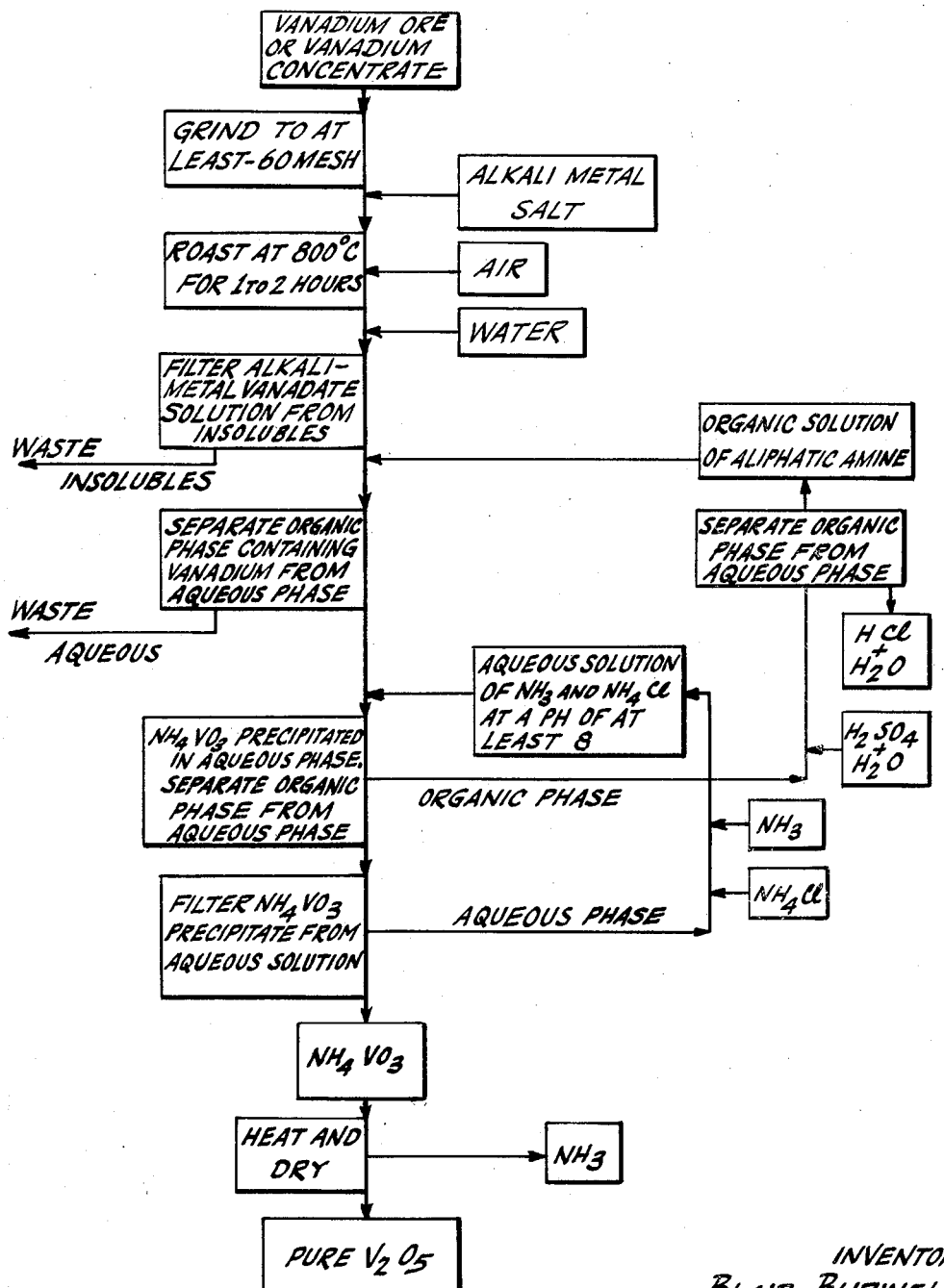
INVENTORS:
BLAIR BURWELL &
A.G.E. ROBIETTE
BY
ATTORNEYS

3,206,276
PROCESS FOR RECOVERY OF PURE $V_2O_5$ FROM VANADIUM BEARING MATERIALS

Blair Burwell, Grand Junction, Colo., and Alfred Gordon Evans Robiette, Bovingdon, Herts, England, assignors to Minerals Engineering Company, Grand Junction, Colo., a corporation of Colorado
Filed Sept. 28, 1961, Ser. No. 141,340
9 Claims. (Cl. 23—18)

This invention relates to the treatment of low-grade vanadium-bearing ores or concentrates for the direct recovery of vanadium oxide in a pure form containing in excess of 99.5% $V_2O_5$.

In the treatment of ores or concentrates containing vanadium for the recovery of vanadium values, it is the custom of the industry to crush the ores to a suitable fineness, such as less than minus 60 mesh, and to roast the ore in suitable roasting furnaces with the addition of sodium salts, such as sodium carbonate, sodium sulfate or sodium chloride, at temperatures of approximately 800° C. whereupon a major portion of the vanadium contained in the ore is converted to a water-soluble salt, i.e., sodium vanadate. Upon subjecting the roasted material to a leaching step with water, the water-soluble sodium vanadate is separated from the residual solids and the residue discharged to tailing piles.

Conventionally, the vanadium is recovered from this solution by subjecting the solution to boiling temperatures with the addition of mineral acids, whereupon an impure compound of vanadium known as "red cake" separates from the solution as a solid and is removed by filtration. The remaining solution contains acid, sodium sulfate, bound phosphorus and other impurities and is discharged to waste. The "red cake" is dried and heated to produce a product containing from 87% to 96% $V_2O_5$, the balance being impurities such as silicon, phosphorus and the like.

In recent years, there has been a growing use for pure vanadium oxide in the making of non-ferrous alloys, such as in metals containing titanium, chromium, vanadium and aluminum, where the sodium, iron, silicon and phosphorus content in the metal must be kept below the limits contained in conventional "red cake" or fused oxide. Usually, this requires a pure vanadium oxide containing more than 99.5% $V_2O_5$ and less than .10% each of sodium and silicon and less than .01% each of phosphorus, chromium and iron.

Recently, we have found that vanadium oxide of high purity (except for high phosphorus content with high phosphorus crude) can be obtained by employing a newly developed extraction procedure. This process is carried out with a class of water-insoluble amine complexing agents which serve as liquid-liquid extraction agents when used in organic solvent such as kerosene or fuel oil. The process is considered a "liquid ion-exchange process" and is carried out as follows:

(a) A vanadium ore, or vanadium concentrate, no larger than 60 mesh is roasted with an alkali metal salt at about 800° C. under full oxidizing conditions for from about 1 to 2 hours.

(b) The oxidized product of (a) is leached with water.

(c) The aqueous slurry of (b) is separated to recover a solution of alkali metal vanadate from insoluble waste.

(d) The aqueous solution of (c) is extracted with an organic solution of a water-insoluble amine to obtain a two-phase liquid mixture.

(e) The mixture of (d) is separated into an aqueous phase which is discarded, and an organic phase containing the vanadium.

(f) The vanadium is separated from the organic phase by extraction of the organic phase with an aqueous solution of an inorganic salt (stripping agent) such as ammonium nitrate, ammonium chloride, sodium sulfate, etc., whereby the vanadium is rendered soluble in the aqueous phase of the resulting two-phase mixture.

(g) The organic phase is separated from the aqueous phase and returned for reuse in step (d).

(h) The aqueous phase from (g) containing vanadium is treated for recovery of the vanadium salt.

A serious problem which has arisen in carrying out the above process is the extensive time required for separating the vanadium salt from the aqueous inorganic salt solution (defined as step (h) above. Present procedures require on the order of 12 hours to allow the vanadium to settle out as a slowly forming precipitate from the aqueous solution. Additional heating of the mother solution has been advocated in order to increase the rate of precipitation. However, this has not materially reduced the precipitation time.

This slow rate of precipitation is a serious drawback since it requires large, bulky holding tanks to permit precipitation of the vanadium precipitate in a quiescent zone. As a result, large quantities of aqueous extracting solution must be held up in the system while the vanadium becomes insoluble. This bottle-neck in the otherwise free-flowing system, seriously reduces economic advantages of the process, and limits flexibility of the entire process. For example, any attempt to increase the vanadium yielding capacity of a given plant is impossible because the vanadium production is limited by that amount which can be handled in the precipitating tanks, regardless of any increase in capacity of previous processing operations.

It is an object of the present process to recover vanadium oxide of high purity by a liquid-liquid extraction process in which the vanadium is immediately precipitated from the extracting solution.

It is a further object of the present process to recover vanadium oxide of high purity, without any material loss of extracting chemicals.

It has been found, unexpectedly, that purified vanadium oxide can be recovered from a vanadium bearing liquid-liquid extraction solution containing a water-insoluble amine in an organic solvent, by contacting the organic liquid-liquid extract with an aqueous solution containing ammonia and ammonium chloride in amounts sufficient to immediately precipitate vanadium as water-insoluble ammonium metavanadate in the aqueous phase. The aqueous and organic phases which are separated from the precipitated ammonium metavanadate are recycled for further extraction.

To effect this result, ammonium chloride must be present in the aqueous extract solution in amounts equivalent to at least about 9% by weight, and further must be present in sufficient quantities to replace all the vanadium ions in the organic phase with chloride ions, thereby forming ammonium metavanadate in the aqueous phase. Additionally, enough ammonia must be present to maintain the aqueous solution at a minimum pH of about 8. When these conditions are met, ammonium metavanadate precipitates as a solid phase in the aqueous layer.

The prime advantage of the present process is the rapid and simultaneous formation of three phases, i.e., an organic extract phase, an aqueous extract phase, and a solid vanadium phase which obviates any necessity for further separating steps. This permits both the aqueous phase (containing ammonium and chloride ions) and the organic phase to be recycled for further extraction without any delay and without wasting any extracting chemicals. The recovered ammonium metavanadate may be marketed as such, or may be heated to expel the ammonia and yield vanadium oxide.

The procedure for carrying out the present process is illustrated in the figure in block form and represents the chemical and physical treating operations which occur. These steps are carried out as follows:

Initially, it is desirable to treat the low-grade ore or concentrates to produce a solution containing sodium vanadate with a minimum of soluble silicon, iron, chromium and phosphorus. This is accomplished by grinding the ore to suitable fineness, usually less than 60 mesh, and roasting it with an alkali metal salt at temperatures approximately 800° C. for 1 to 2 hours under fully oxidizing conditions. Preferably, the roaster gases should be adjusted to contain in excess of 8% $O_2$ in order to fully oxidize ferric chloride to ferric oxide, calcium chloride to calcium oxide and to avoid the formation of soluble iron salts. Sodium chloride is the preferred alkali metal salt because it minimizes the formation of soluble sodium silicate, sodium aluminate, sodium chromate and sodium phosphate which are objectionable in subsequent steps of this process. The roasted ore is leached with water and the residue separated from the leach solution. The recovered leach solution generally has a pH of between 5.5 and 6.

The leach solution is then intimately mixed with a water-insoluble, substituted amine complex dissolved in an organic solvent such as kerosene or fuel oil. This organic solution serves as a liquid-liquid solvent extraction agent, although it is also referred to as a "liquid ion-exchange process." These amines are present as organic complexes containing sulfate ions in the molecule. Their operation is described in "Fatty Nitrogen Chemicals in Mineral Concentration" (1959), supplied by the Chemical Divisions of General Mills. Of the amines which have been found suitable, the preferred ones are the tertiary alkyl amines, particularly those containing saturated straight chain groups of 8 to 10 carbon atoms, which have been treated to provide sulfate ions in the molecule, as by treatment with aqueous sulfuric acid.

If properly carried out, in excess of 99% of the vanadium contained in the water solution will be transferred to the organic extract solution. This is accomplished by using sufficient organic solution to react with all the vanadium in the aqueous solution. The amount required is generally determined by laboratory test methods preceding the operation. Usually, sufficient organic is supplied so that, after mixing, it will contain from 2.5 to 15 grams of $V_2O_5$ per liter, and the separated water solution from a trace to .1 gram of $V_2O_5$ per liter. In this way, the vanadium oxide is transferred from its sodium-bearing molecule in the water solution to the water-insoluble organic as a vanadium amine complex.

An important and essential part of this invention consists in recovering the vanadium from its organic solution as pure ammonium metavanadate in solid form. This is accomplished by mixing the organic extract thoroughly with an aqueous solution containing ammonia and ammonium chloride. Sufficient chloride ions from the ammonium chloride must be present to displace the vanadium ions in the organic phase. The liberated vanadium ions form ammonium metavanadate in the aqueous extract. The ammonium metavanadate immediately precipitates in the aqueous extract if enough additional ammonium chloride is present to form at least a 9% by weight solution of ammonium chloride in the aqueous phase after precipitation, and if ammonia is present in sufficient amounts to maintain the aqueous extract at a pH in excess of about 8.

This combination of ammonium chloride and ammonia can be supplied in a number of obvious ways, e.g., by mixtures of ammonium chloride and aqueous ammonia, or by ammonium hydroxide and chlorine gas, or by ammonium hydroxide and hydrochloric acid. The term ammonia as employed in the herein specification and claims refers to both gaseous ammonia and to aqueous solutions of ammonium compounds which form basic ammonium hydroxide. It is not essential to the practice of the invention how the ammonia and ammonium chloride are supplied. It is essential only that they are present in sufficient quantities to obtain an aqueous insoluble precipitate of ammonium metavanadate. The preferred concentrations in the aqueous extract solution, expressed as free ammonia and ammonium chloride, are 1% ammonia as $NH_3$ and 14% ammonium chloride as $NH_4Cl$.

After thoroughly mixing the vanadium-bearing organic phase with an aqueous solution containing combinations of ammonia and ammonium chloride as described, the organic mixture is separated from the aqueous phase by settling. The vanadium oxide content of the organic phase will be contained in a white precipitate in the aqueous solution in the form of pure ammonium metavanadate which can be readily separated from the aqueous extract. The separated ammonium metavanadate is dried and marketed as ammonium metavanadate, or heated to expel the ammonia and marketed as pure vanadium oxide.

The separated aqueous solution obtained during the filtration of the solid ammonium metavanadate is of high purity and is immediately returnable for reuse in the circuit. Similarly, the separated organic mixture, stripped of its vanadium, is regenerated and also returned for reuse, thus establishing an economic and easily operated vanadium recovery circuit. The regeneration merely involves replacing the chloride ions in the amine molecule with sulfate ions, by washing the organic solution with an aqueous sulfuric acid solution.

Since the ammonium chloride-ammonium hydroxide aqueous solution used in recovering the vanadium from the organic solution can be reused, its concentration is maintained sufficiently high so that quick and complete extraction of the vanadium from the organic solution takes place. It is desirable, but not essential, to maintain the concentration of ammonium chloride in excess of 14%. This is effected by replacing ammonia and chlorine, in any convenient form, in the recycled solution in the quantity consumed in the reaction. Accordingly, the only consumption of ammonia and chlorine in this cyclic circuit is the ammonia contained in the ammonium metavanadate and the chlorine required to displace the vanadium anion in the organic phase. Practically, this has been found to be approximately .44 pound of $NH_3$ per pound of $V_2O_5$ and .21 pound of $Cl_2$ per pound of $V_2O_5$ recovered.

The following example is presented as representative of the present invention but is not intended as limitative thereof.

An iron-bearing ore from the Republic of South Africa containing 55% Fe, 11% $TiO_2$, 1.65% $V_2O_5$, .35% $Cr_2O_3$ and 1.5% SiO was ground to minus 100 mesh and mixed with 8% NaCl. The ore was then subjected to roasting at a temperature of 800° C. for 1 hour with 10% excess oxygen, cooled and leached with water. After filtration, the solution contained 2% $V_2O_5$ as sodium vanadate, trace iron, chromium, titanium and silica and 4% NaCl. The rejected tailings contained all the iron, silica, titanium and .41% $V_2O_5$, representing a recovery of 75% of the ore contained vanadium in the solution.

One part of the solution was then extracted with 1½ parts by volume of an organic solution for 20 minutes. This solution was made up of 9 parts of a mixture of modified tertiary alkyl amines, each having 3 saturated straight chains of 8 to 10 carbon atoms, with 95% by weight of the mixture containing the 8 carbon length chains, 3 parts of isodecanol and 88 parts of kerosene. The modification of the amines involved treatment with an aqueous solution of $H_2SO_4$ to form the corresponding amine sulfate salt. The solutions were then settled and samples taken for analysis. The aqueous solution assayed trace $V_2O_5$, while the organic solution contained 13.2 grams of $V_2O_5$ per liter.

The organic phase was then thoroughly mixed with equal parts of a solution containing 10 grams per liter of NH₃ and 140 grams per liter of NH₄Cl. Upon settling, the ammonia solution was filtered and washed. The filtered ammonium metavanadate was then calcined to vanadium oxide and analyzed. It contained 99.98% V₂O₅, .007% Na and trace silica.

The organic phase assayed 1 gram per liter of V₂O₅ and was used to repeat the cycle by extracting another portion of the solution. The ammonia-ammonium chloride solution from the first cycle was reused to recover the vanadium from the second cycle, after adding a small amount of ammonia and ammonium chloride.

This was repeated after six times in a cyclic manner. It was found that the total amount of vanadium lost in the discarded solution was less than .5% and the consumption of ammonia was .40 gram per gram of V₂O₅ and .20 pound of chloride per gram of V₂O₅.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In a process of recovering vanadium compounds in excess of 99.5% purity from vanadium-bearing material, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 6 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities, extracting the vanadium ion from the separated organic phase by mixing with an aqueous solution containing ammonium chloride and ammonia in quantities not less than 9% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the organic phase from the aqueous phase containing the crystalline ammonium vanadate, separating the ammonia vanadate from the aqueous phase by filtration, and subjecting the crystalline ammonium metavanadate to heating to form pure vanadium pentoxide containing not less than 99.5% V₂O₅.

2. In a process of recovering vanadium compounds in excess of 99.5% purity from vanadium-bearing material, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 6 in the leach solution, and filtering the leaching slurry for separation of the sodium vanadate solution from insolubles, the improvement which comprises extracting about 99% of the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities, extracting the vanadium ion from the separated organic phase by mixing with an aqueous solution containing ammonium chloride and ammonia in quantities not less than 9% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the organic phase from the aqueous phase containing the crystalline ammonium vanadate, separating the ammonium vanadate from the aqueous phase by filtration, and subjecting the crystalline ammonium metavanadate to heating to form pure vanadium pentoxide containing not less than 99.5% V₂O₅.

3. In a process of recovering vanadium compounds in excess of 99.5% purity from vanadium-bearing material, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 6 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities, discharging the separated aqueous solution containing metallic impurities from the treatment, extracting the vanadium ion from the separated organic phase by mixing with an aqueous solution containing ammonium chloride and ammonia in quantities not less than 9% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the organic phase from the aqueous phase containing the crystalline ammonium vanadate, separating the ammonium vanadate from the aqueous phase by filtration, and subjecting the crystalline ammonium metavanadate to heating to form pure vanadium pentoxide containing not less than 99.5% V₂O₅.

4. In a process of recovering vanadium compounds in excess of 99.5% purity from vanadium-bearing material, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 6 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities, extracting the vanadium ion from the separated organic phase by mixing with an aqueous solution containing ammonium chloride and ammonia in quantities not less than 9% ammonium chloride by weight and not less than 1% ammonia by weight to maintain a pH of at least 8 and thereby form a three-phase mixture of an organic phase in a treatment time not exceeding fifteen minutes, an aqueous phase containing ammonia chloride and ammonia, and a solid phase of crystalline ammonium metavanadate in the form of a slurry in the aqueous phase, separating the organic phase from the aqueous phase containing the crystalline ammonium vanadate, separating the ammonium vanadate from the aqueous phase by filtration, and subjecting the crystalline ammonium metavanadate to heating to form pure vanadium pentoxide containing not less than 99.5% $V_2O_5$.

5. In a continuous process of recovering vanadium compounds in excess of 99.5% purity from vanadium-bearing material, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 6 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities, extracting the vanadium ion from the separated organic phase by mixing with an aqueous solution containing ammonium chloride and ammonia in quantities not less than 9% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the organic phase from the aqueous phase containing the crystalline ammonium vanadate, separating the ammonium vanadate from the aqueous phase by filtration, and recycling the separated aqueous phase filtrate to the three-phase extraction stage after addition of sufficient ammonium chloride to provide a concentration of at least 8 to 9% by weight and sufficient ammonia to establish a pH of at least 8.

6. In a process of recovering vanadium compounds in excess of 99.5% purity from vanadium-bearing material, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 6 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities, extracting the vanadium ion from the separated organic phase by mixing with an aqueous solution containing ammonium chloride and ammonia in quantities not less than 9% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the organic phase from the aqueous phase containing the crystalline ammonium vanadate, separating the ammonium vanadate from the aqueous phase by filtration, and expelling ammonia from the purified crystalline ammonium metavanadate before it is discharged from the treatment as a dried product.

7. In a process of recovering vanadium compounds in excess of 99.5% purity from vanadium-bearing material, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 6 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities, extracting the vanadium ion from the separated organic phase by mixing with an aqueous solution containing ammonium chloride and ammonia in quantities not less than 9% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the organic phase from the aqueous phase containing the crystalline ammonium vanadate, recycling the separated organic phase to the two-phase mixture stage, regenerating the organic solution before introduction into said stage by washing with dilute aqueous sulfuric acid solution, separating the ammonium vanadate from the aqueous phase by filtration, and subjecting the crystalline ammonium metavanadate to heating to form pure vanadium pentoxide containing not less than 99.5% $V_2O_5$ and not more than .02% $P_2O_5$.

8. In a process of recovering canadium compounds in excess of 99.5% purity from vanadium-bearing material, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 6 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities, extracting the vanadium ion from the separated organic phase by mixing with an aqueous solution containing ammonium chloride and ammonia in quantities not less than 9% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the organic phase from the aqueous phase containing the crystalline ammonium vanadate, separating the ammonium vanadate from the aqueous phase by filtration, recycling the separated aqueous phase to the three-phase extraction stage, and maintaining a substantially uniform ammonium chloride concentration in the recycled aqueous phase by replacing ammonia and chlorine therein in the approximate quantity consumed in the reaction of the preceding cycle.

9. In a continuous process of recovering vanadium compounds in excess of 99.5% purity from vanadium-bearing material, including roasting such a vanadium-bearing material mixed with sodium chloride and in finely divided condition at a temperature of about 800° C. under oxidizing conditions so as to form water soluble sodium vanadate substantially free of silicon, iron, chromium and phosphorus, leaching the roast calcine with water and establishing a pH of about 5.5 to 6 in the leach solution, and filtering the leaching slurry for separation of the sodium vanadate solution from insolubles, the improvement which comprises extracting the anionic vanadium oxide component of the sodium vanadate compound in the aqueous leach solution into a liquid-to-liquid ion exchange organic solution which consists of a water insoluble amine complexing agent, having three long chain aliphatic hydrocarbon groups, each having 8 to 10 carbon atoms and sulfate ions in the molecule, said compound being dissolved in an organic solvent selected from the group consisting of kerosene and fuel oil to obtain a two-phase liquid mixture, separating the organic phase from the aqueous phase containing metallic cationic impurities, extracting the vanadium ion from the separated organic phase by mixing with an aqueous solution containing ammonium chloride and ammonia in quantities not less than 9% ammonium chloride by weight and not less than 1% ammonia by weight to maintain a pH of at least 8 and thereby form a three-phase mixture of an organic phase, an aqueous phase containing ammonia chloride and ammonia, and a solid phase of crystalline ammonium metavanadate in the form of a slurry in the aqueous phase, separating the organic phase from the aqueous phase containing the crystalline ammonium vanadate, separating the ammonium vanadate from the aqueous phase by filtration, recycling the separated aqueous phase to the three-phase extraction stage, and maintaining an ammonium chloride concentration of over 14% in the recycled aqueous phase by replacing the ammonia and chlorine consumed in the reaction of the preceding cycle.

References Cited by the Examiner

UNITED STATES PATENTS

| | | | |
|---|---|---|---|
| 2,227,833 | 1/41 | Hixon et al. | 23—19 X |
| 2,551,733 | 5/51 | Dunn et al. | 23—140 |
| 2,771,341 | 11/56 | Barth | 23—51 |
| 2,877,250 | 3/59 | Brown et al. | 23—312 X |
| 3,052,516 | 9/62 | Drobnick et al. | 23—51 |
| 3,067,008 | 12/62 | Pilloton | 23—140 |
| 3,083,085 | 3/63 | Lewis et al. | 23—312 |

OTHER REFERENCES

Coleman et al.: "Proceedings of International Conference on Peaceful Uses of Atomic Energy," vol. 28, pages 278 to 288 (1958).

MAURICE A. BRINDISI, *Primary Examiner.*